(12) United States Patent
Ji

(10) Patent No.: US 12,742,913 B2
(45) Date of Patent: Sep. 22, 2026

(54) METHOD OF MANUFACTURING DISPLAY DEVICE AND PROTECTIVE FILM ASSEMBLY

(71) Applicant: Samsung Display Co., LTD., Yongin-si (KR)

(72) Inventor: Myungsun Ji, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 308 days.

(21) Appl. No.: 18/376,180

(22) Filed: Oct. 3, 2023

(65) Prior Publication Data

US 2024/0176048 A1 May 30, 2024

(30) Foreign Application Priority Data

Nov. 29, 2022 (KR) ........................ 10-2022-0162130

(51) Int. Cl.

*G02B 1/14* (2015.01)
*B32B 37/00* (2006.01)
*B32B 37/26* (2006.01)
*G02B 1/115* (2015.01)

(52) U.S. Cl.

CPC .............. *G02B 1/14* (2015.01); *B32B 37/025* (2013.01); *G02B 1/115* (2013.01); *B32B 2037/268* (2013.01)

(58) Field of Classification Search

None

See application file for complete search history.

(56) References Cited

U.S. PATENT DOCUMENTS 10,665,816 B2 5/2020 Oh et al.
2014/0130339 A1* 5/2014 Shin ....................... H10K 71/00 29/592.1
2022/0140295 A1 5/2022 Lee et al.
2023/0303893 A1* 9/2023 Fukuda .................... C09J 7/405

FOREIGN PATENT DOCUMENTS

KR 1020200033366 A 3/2020
KR 1020220060971 A 5/2022

* cited by examiner

*Primary Examiner* — Richard H Kim

(74) *Attorney, Agent, or Firm* — CANTOR COLBURN LLP

(57) ABSTRACT

A manufacturing method of a display device includes: forming a window assembly; forming a display module; and attaching the window assembly to the display module. The forming of window assembly includes: preparing a substrate; placing a first protective film assembly including a plurality of first protective films and a first release film on an upper surface of the substrate; removing the first release film from the first protective films; and attaching the first protective films to the upper surface of the substrate.

13 Claims, 14 Drawing Sheets

METHOD OF MANUFACTURING DISPLAY DEVICE AND PROTECTIVE FILM ASSEMBLY

This application claims priority to Korean Patent Application No. 10-2022-0162130, filed on Nov. 29, 2022, and all the benefits accruing therefrom under 35 U.S.C. § 119, the content of which in its entirety is herein incorporated by reference.

BACKGROUND

1. Field of Disclosure

The present disclosure relates to a method of manufacturing a display device and a protective film assembly. More particularly, the present disclosure relates to a method of manufacturing a display device including a window with improved quality and a protective film assembly.

2. Description of the Related Art

A display device that provides images to a user, such as a television set, a monitor, a smart phone, and a tablet computer, include a display panel to display the images. Various types of display panels, such as a liquid crystal display panel, an organic light emitting display panel, an electrowetting display panel, and an electrophoretic display panel, are being developed. A window is required to have an impact resistance such as surface hardness or strength and to have a uniform and transparent surface to allow the user to view an input of the user or an output of the display device from the outside.

SUMMARY

The present disclosure provides a method of manufacturing a display device including a window with improved quality.

The present disclosure provides a protective film assembly used for the manufacturing of the display device including the window with improved quality.

Embodiments of the invention provide a method of manufacturing a display device. The method includes: forming a window assembly; forming a display module; and attaching the window assembly to the display module. The forming of window assembly includes: preparing a substrate; placing a first protective film assembly including a plurality of first protective films and a first release film on an upper surface of the substrate; removing the first release film from the first protective films; and attaching the first protective films to the upper surface of the substrate.

The attaching of the window assembly to the display module includes: removing the first protective films from the upper surface of the substrate and attaching an upper member to the upper surface of the substrate.

In the placing of the first protective film assembly on the upper surface of the substrate, the first release film, which is monolithic, may be attached to one surface of each of the first protective films facing the upper surface of the substrate.

The forming of the window assembly may further include: placing a second protective film assembly including a plurality of second protective films and a second release film on a lower surface of the substrate; removing the second release film from the second protective films; and attaching the second protective films to the lower surface of the substrate.

The attaching of the window assembly to the display module may include: removing the second protective films from the lower surface of the substrate; and attaching a lower member to the lower surface of the substrate.

In the placing of the second protective film assembly on the lower surface of the substrate, the second release film, which is monolithic, may be attached to one surface of each of the second protective films facing the lower surface of the substrate.

The substrate may include short sides extending in a first direction and long sides extending in a second direction crossing the first direction, and each of the first protective films and each of the second protective films include long sides, short sides, and a protrusion protruded from at least one portion of portions where the long sides intersect the short sides.

The long sides of each of the first protective films may extend in the first direction, and the short sides of each of the first protective films may extend in the second direction.

The short sides of each of the first protective films may extend in the first direction, and the long sides of each of the first protective films may extend in the second direction.

An angle between a longitudinal direction of the protrusion of the first protective films and the long side of each of the first protective films may be about 45 degrees.

The protrusion of the first protective films may not overlap the protrusion of the second protective films in a plan view.

The number of the first protective films may be four.

The number of the second protective films may be four.

Embodiments of the invention provide a protective film assembly including: a plurality of protective films each including a first surface and a second surface opposite to the first surface; and a release film, which is monolithic and attached to the first surface of each of the protective films.

Each of the protective films may include long sides, short sides, and a protrusion that protrudes from at least one portion of portions where the long sides intersect the short sides.

An angle between a longitudinal direction of the protrusion and the long sides of the protective films may be about 45 degrees.

The number of the protective films may be two.

The number of the protective films may be four.

A boundary between the protective films may overlap the release film in a plan view.

According to the above, the protective film assembly includes the protective films and the monolithic release film attached to the protective films. As the protective film assembly includes plural protective films, a size of each protective film that covers the substrate decreases. Accordingly, the release force applied when the protective film is removed or separated from the substrate is reduced. Thus, separation of the substrate from the stage, which is caused by the great release force, and delamination or damage of the substrate, which occurs when the protective films are removed, are reduced, and a size of an equipment used to peel the protective films decreases.

According to the above, the release film is monolithic and attached to the protective films, and thus, tolerances associated with attaching the protective films to the substrate is effectively reduced or prevented from occurring. Accordingly, defects, such as a void or an overlap between the protective films, do not occur, and thus, foreign substances or stains on the substrate is reduced or prevented from occurring.

BRIEF DESCRIPTION OF THE DRAWINGS

The above and other advantages of the present disclosure will become readily apparent by reference to the following detailed description when considered in conjunction with the accompanying drawings wherein.

DETAILED DESCRIPTION

Figure 1:
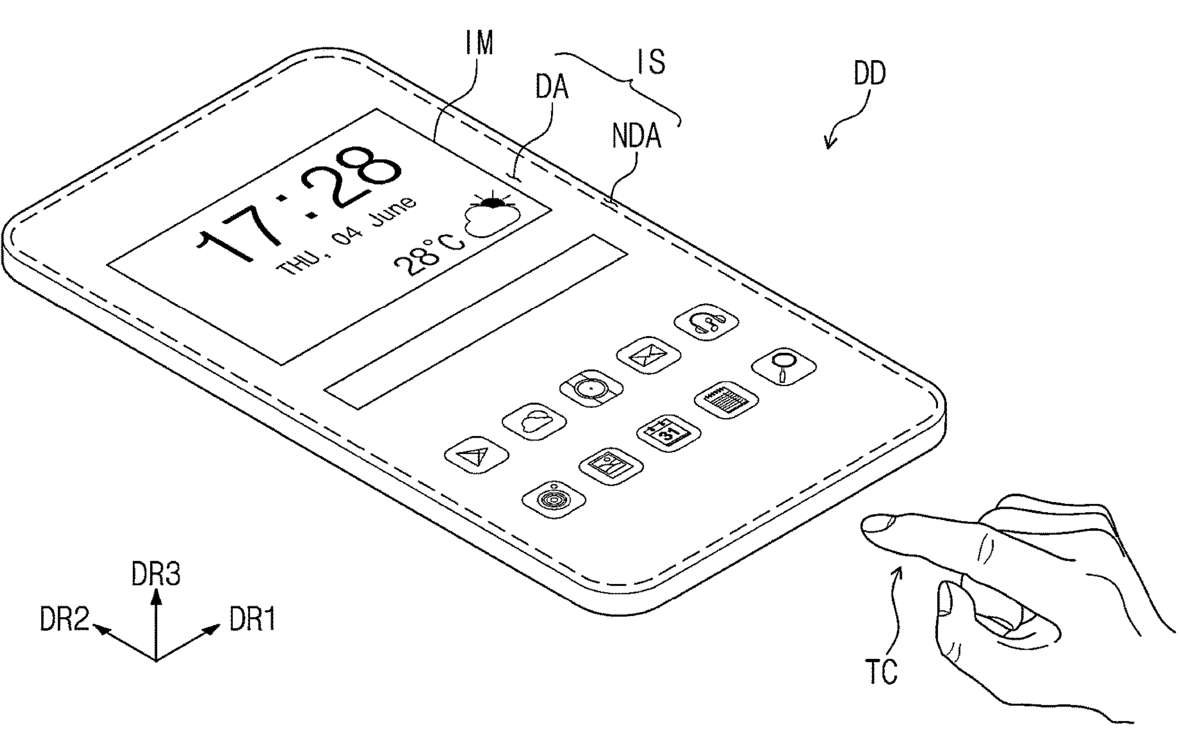
FIG. 1 is a perspective view of a display device according to an embodiment of the present disclosure.

In the present disclosure, it will be understood that when an element (or area, layer, or portion) is referred to as being "on", "connected to" or "coupled to" another element or layer, it can be directly on, connected or coupled to the other element or layer or intervening elements or layers may be present.

Like numerals refer to like elements throughout. In the drawings, the thickness, ratio, and dimension of components are exaggerated for effective description of the technical content. As used herein, the term "and/or" may include any and all combinations of one or more of the associated listed items.

It will be understood that, although the terms "first", "second", etc. may be used herein to describe various elements, these elements should not be limited by these terms. These terms are only used to distinguish one element from another element. Thus, a first element discussed below could be termed a second element without departing from the teachings of the present disclosure. As used herein, the singular forms, "a", "an" and "the" are intended to include the plural forms as well, unless the context clearly indicates otherwise.

Spatially relative terms, such as "beneath", "below", "lower", "above", "upper" and the like, may be used herein for ease of description to describe one element or feature's relationship to another elements or features as shown in the figures.

It will be further understood that the terms "include" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described with reference to accompanying drawings.

FIG. 1 is a perspective view of a display device DD according to an embodiment of the present disclosure.

Referring to FIG. 1, the display device DD may be activated in response to electrical signals. FIG. 1 shows a smartphone as the display device DD, however, the display device DD should not be limited to the smartphone and may be applied to a variety of electronic devices. As an example, the display device DD may be applied to a large-sized electronic item, such as a television set, a monitor, etc., and a small and medium-sized electronic item, such as a mobile phone, a tablet computer, a car navigation unit, a game unit, etc.

The display device DD may display an image IM on a display surface IS substantially parallel to each of first and second directions DR1 and DR2 toward a third direction DR3. The display surface IS on which the image IM is displayed may correspond to a front surface of the display device DD. The image IM may be a video or a still image. FIG. 1 shows a weather and clock widget and application icons as representative examples of the image IM.

In the present disclosure, front (or upper) and rear (or lower) surfaces of each member of the display device DD may be defined with respect to a direction in which the image IM is displayed. The front and rear surfaces may be opposite to each other in the third direction DR3, and a normal line direction of each of the front and rear surfaces may be substantially parallel to the third direction DR3.

A separation distance in the third direction DR3 between the front and rear surfaces of each member may correspond to a thickness/height in the third direction DR3 of the each member. Meanwhile, directions indicated by the first, second, and third directions DR1, DR2, and DR3 may be relative to each other and may be changed in other directions.

The display device DD may sense a user input TC applied thereto from the outside. The user input TC may include various forms of external inputs. In an embodiment, for example, the external inputs may include a proximity input (e.g., a hovering input) applied when approaching close to or adjacent to the display device DD at a predetermined distance as well as a touch input by a user's body part (e.g., a user's hand) or external inputs provided in the form of light, heat, or pressure. In addition, the display device DD may sense the user input TC applied to a side or rear surface of the display device DD depending on a structure of the display device DD, and the present disclosure should not be limited to a particular embodiment.

The display device DD may include short sides extending in the first direction DR1 and long sides extending in the second direction DR2 crossing the first direction DR1. FIG. 1 shows the display device DD having a rectangular shape as a representative example, however, the shape of the display device DD should not be limited to the rectangular shape. According to an embodiment, the display device DD may have a variety of shapes such as a polygonal shape, a circular shape, or an irregular shape.

The display device DD may include the display surface IS. The display surface IS may include a display area DA and a non-display area NDA. The display area DA may be activated in response to electrical signals. The image IM may be displayed on the display area DA, and user input TC (e.g. various types of external inputs) may be sensed in the display area DA.

The non-display area NDA may be defined adjacent to the display area DA, and the image IM may not be displayed on the non-display area NDA. The non-display area NDA may have a predetermined color. The non-display area NDA may surround the display area DA. That is, the shape of the display area DA may be defined by the non-display area NDA, however, this is merely an example. According to an embodiment, the non-display area NDA may be defined adjacent to only one side of the display area DA or may be omitted.

Figure 2:
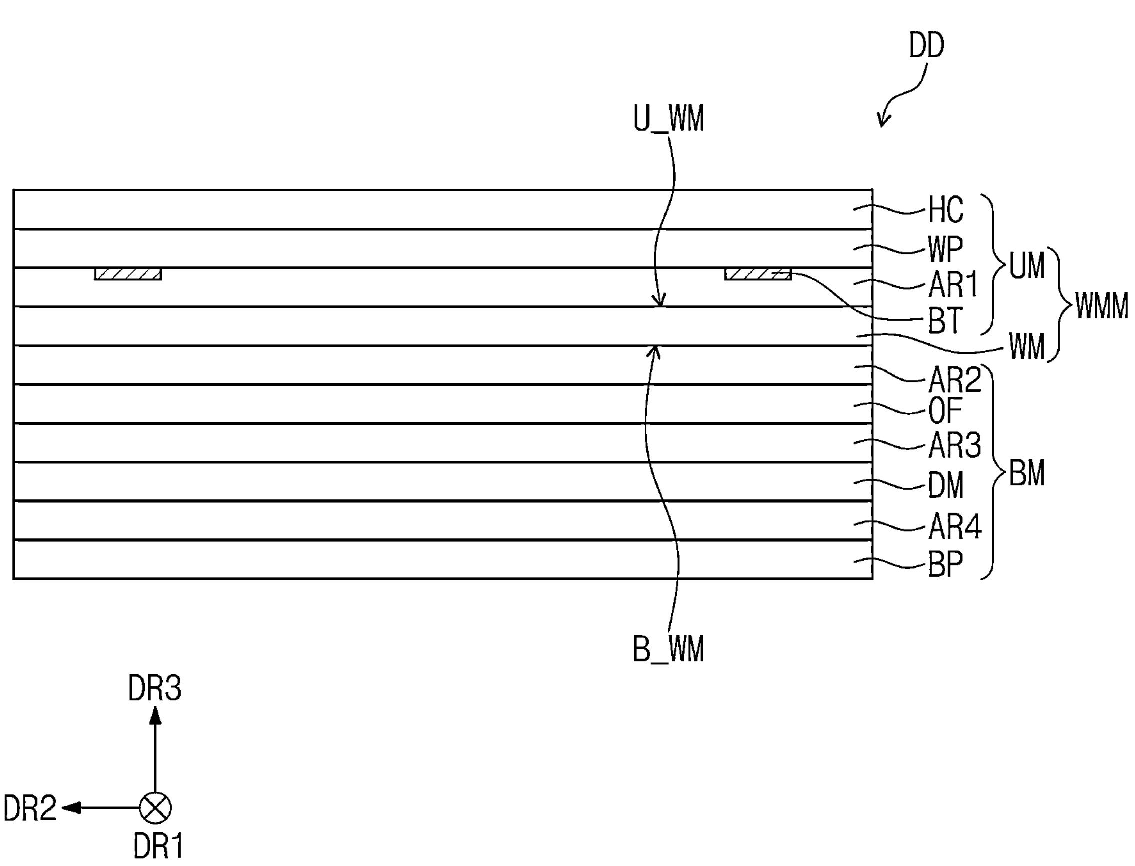
FIG. 2 is a cross-sectional view of a display device according to an embodiment of the present disclosure.

FIG. 2 is a cross-sectional view of the display device DD according to an embodiment of the present disclosure.

Referring to FIG. 2, the display device DD may include a window module WMM and a lower member BM. The window module WMM may be attached to a housing (not shown) to define an exterior of the display device DD and may protect a display module DM of the lower member BM. The lower member BM may be disposed under the window module WMM.

The window module WMM may include a hard coating layer HC, a window protective layer WP, a first adhesive layer AR1, a light blocking pattern BT, and a substrate WM. The hard coating layer HC, the window protective layer WP, the first adhesive layer AR1, and the light blocking pattern BT may be referred to as an upper member UM.

The substrate WM may include a material with high light transmittance. The substrate WM may be a glass substrate that is chemically tempered.

The window protective layer WP may be disposed on the substrate WM. The window protective layer WP may be attached to an upper surface U_WM of the substrate WM by the first adhesive layer AR1. The window protective layer WP may include a plastic film. As an example, the window protective layer WP may include at least one of polyimide, polycarbonate, polyamide, triacetylcellulose, polymethylmethacrylate, and polyethylene terephthalate.

The light blocking pattern BT may be disposed on a lower surface of the window protective layer WP. The light blocking pattern BT may be disposed on one surface of the window protective layer WP, which faces the substrate WM. The first adhesive layer AR1 may cover the light blocking pattern BT, however, it should not be limited thereto or thereby.

The light blocking pattern BT may be a colored light blocking layer and may be formed by a coating process. The light blocking pattern BT may include a base material and a dye or a pigment mixed with the base material. Accordingly, a user may perceive the non-display area NDA (refer to FIG. 1) of the display device DD (refer to FIG. 1) due to the color of the light blocking pattern BT. That is, the light blocking pattern BT may overlap the non-display area NDA shown in FIG. 1.

FIG. 2 shows a structure in which the light blocking pattern BT is spaced apart from an end of the window protective layer WP and disposed inwardly of the window protective layer WP, however, the present disclosure should not be limited thereto or thereby. According to an embodiment, the light blocking pattern BT may be disposed under the window protective layer WP to be aligned with an end of the window protective layer WP, but should not be particularly limited.

In addition, FIG. 2 shows a structure in which the light blocking pattern BT is disposed on the lower surface of the window protective layer WP as a representative example, however, the present disclosure should not be limited thereto or thereby. As an example, the light blocking pattern BT may be disposed on an upper surface of the window protective layer WP or one of upper and lower surfaces of the substrate WM.

The hard coating layer HC may be disposed on the window protective layer WP and may be disposed at an outermost position of the window module WMM. The hard coating layer HC may be coated on the window protective layer WP as a functional layer that improves characteristics of use of the display device DD. In an embodiment, for example, the hard coating layer HC may improve anti-fingerprint characteristics, anti-pollution characteristics, scratch-resistant characteristics, and the like.

The lower member BM may include an optical film OF, the display module DM, a lower plate BP, and adhesive layers AR2, AR3, and AR4.

The optical film OF may be disposed under the window module WMM. The optical film OF may be attached to the lower surface B_WM of the substrate WM by a second adhesive layer AR2. The optical film OF may reduce a reflectance of the display module DM with respect to an external light incident into the display module DM. Although not shown in figures, the optical film OF may further include at least one of an anti-reflective film, a polarizing film, a color filter, and a gray filter.

The display module DM may be disposed under the optical film OF. The display module DM and the optical film OF may be attached to each other by a third adhesive layer AR3. The display module DM may function as an output device that displays images and an input device that senses an input applied thereto from the outside. As an example, the display module DM may include a display layer and a sensor layer. The display layer may have a configuration that generates the image. The display layer may be one of an organic light emitting display panel, a quantum-dot display panel, and an inorganic light emitting display panel, but should not be particularly limited.

The lower plate BP may be disposed under the display module DM. The display module DM and the lower plate BP may be attached to each other by a fourth adhesive layer AR4. The lower plate BP may support components disposed above the lower plate BP and may improve a heat dissipation performance of the display device DD.

Although not shown in FIG. 2, the lower member BM may further include a panel protective layer. The panel protective layer may be disposed between the display module DM and the lower plate BP. The panel protective layer may reduce a stress applied to the display module DM, may prevent external moisture from entering the display module DM, and may absorb external impacts.

Each of the first, second, third, and fourth adhesive layers AR1, AR2, AR3, and AR4 may be a transparent adhesive layer including one of pressure sensitive adhesive film ("PSA"), an optically clear adhesive film ("OCA"), and optically clear resin ("OCR"). In addition, at least one adhesive layer among the first, second, third, and fourth adhesive layers AR1, AR2, AR3, and AR4 may be omitted.

Figure 3:
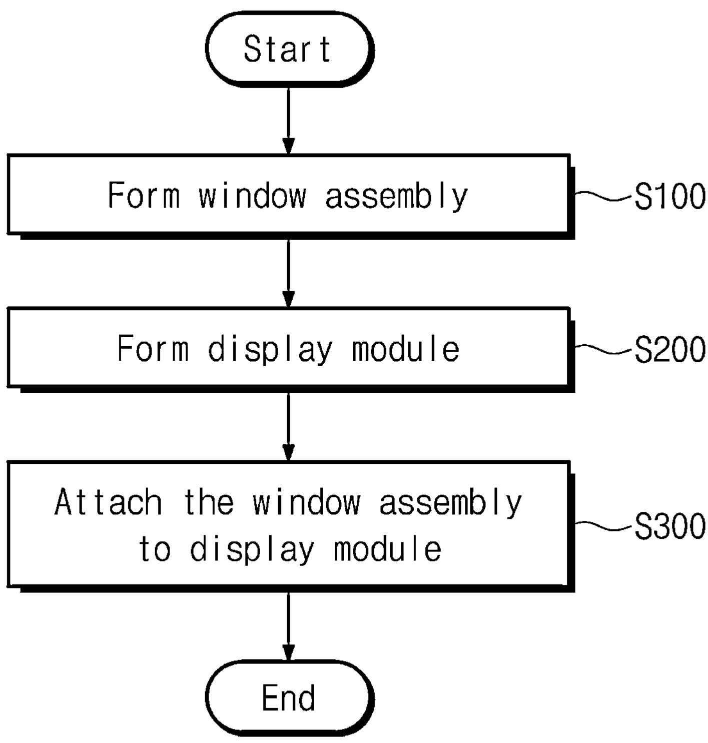
FIG. 3 is a flowchart of a method of manufacturing a display device according to an embodiment of the present disclosure.

FIG. 3 is a flowchart of a method of manufacturing the display device according to an embodiment of the present disclosure.

Referring to FIG. 3, the manufacturing method of the display device may include forming a window assembly (S100), forming the display module (S200), and attaching the window assembly to the display module (S300).

Figure 4:
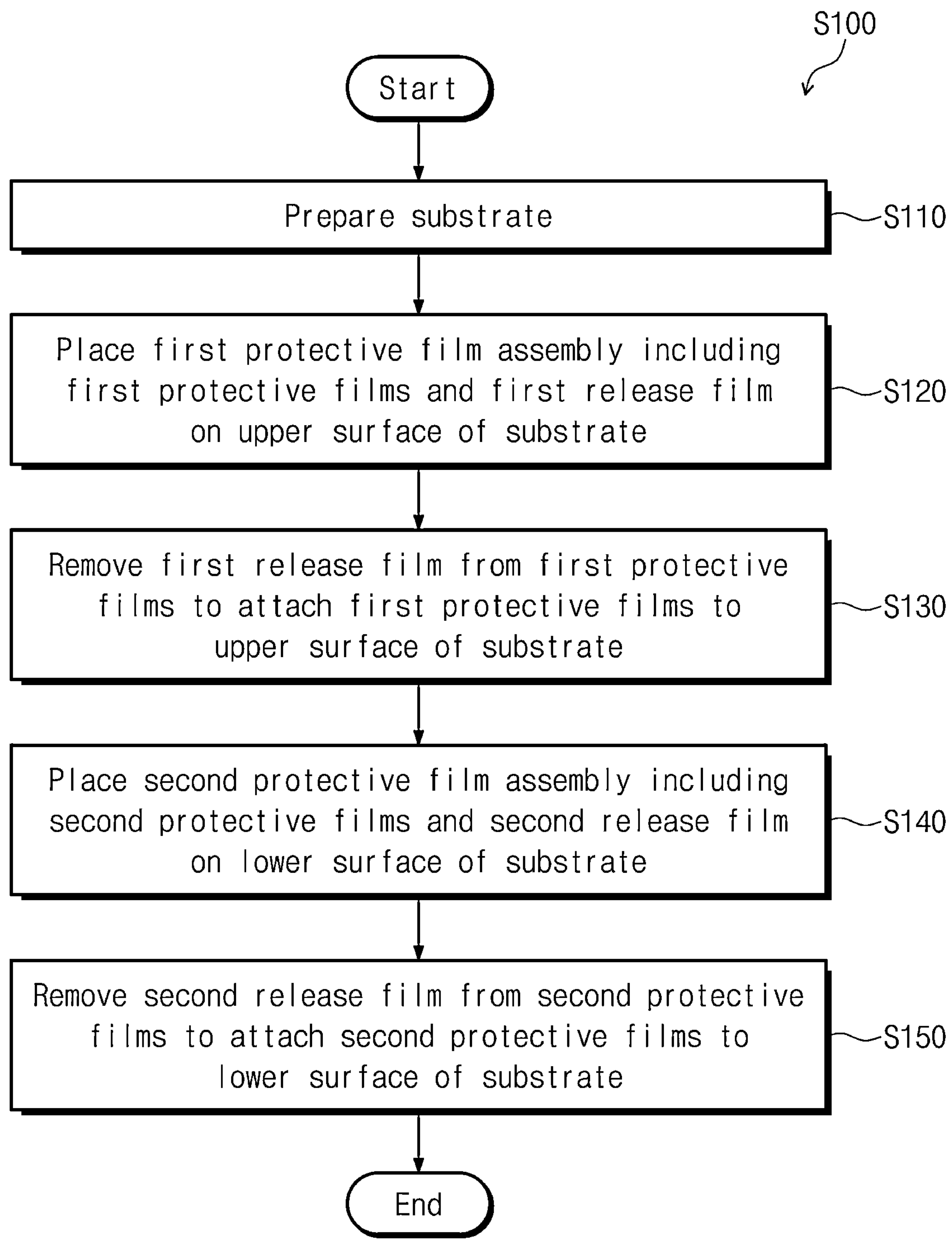
FIG. 4 is a flowchart of a method of forming a window assembly according to an embodiment of the present disclosure.

FIG. 4 is a flowchart of a method of forming the window assembly according to an embodiment of the present disclosure.

Referring to FIG. 4, the forming of the window assembly (S100) may include: preparing the substrate (S110), placing a first protective film assembly including a plurality of first protective films and a first release film on an upper surface of the substrate (S120), removing the first release film from the plurality of first protective films to attach the plurality of first protective films to the upper surface of the substrate (S130), placing a second protective film assembly including a plurality of second protective films and a second release film on a lower surface of the substrate (S140), and removing the second release film from the plurality of second protective films to attach the plurality of second protective films to the lower surface of the substrate (S150).

Figure 5:
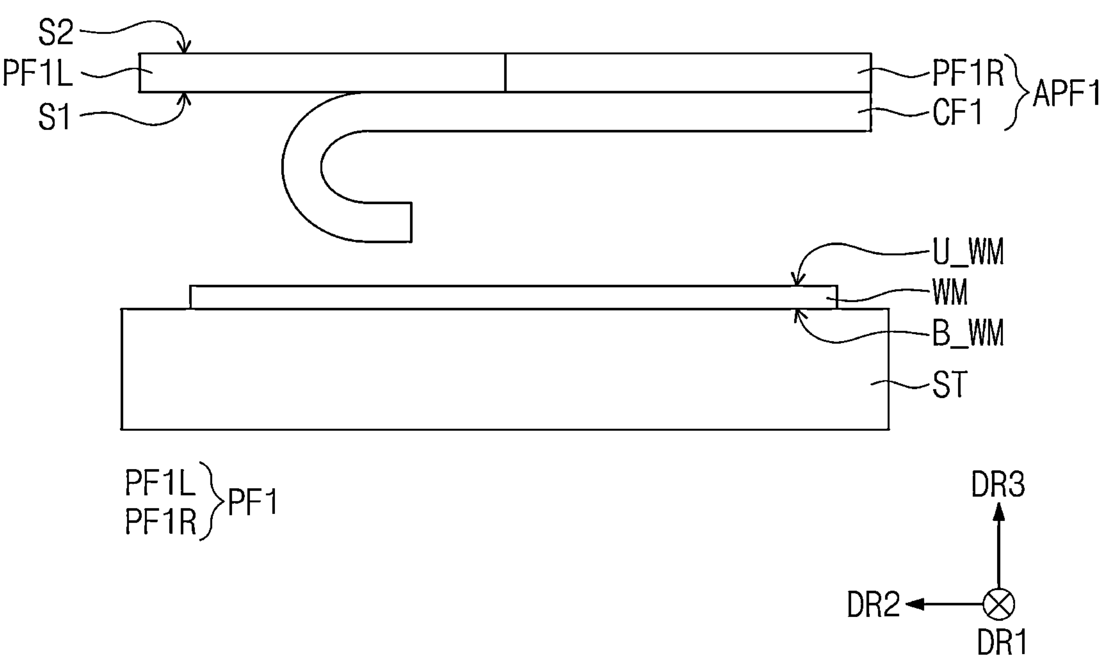
FIGS. 5 and 6 are views of a method of manufacturing a display device according to an embodiment of the present disclosure.

FIG. 5 is a view of a method of manufacturing the display device according to an embodiment of the present disclosure. FIG. 5 shows a process of attaching the first protective films PF1 to the upper surface U_WM of the substrate WM.

Referring to FIGS. 4 and 5, the substrate WM may be prepared on a stage ST (S110). The stage ST may hold the substrate WM using a vacuum pressure. The first protective film assembly APF1 may be disposed above the upper surface U_WM of the substrate WM (S120). In this case, the lower surface B_WM of the substrate WM may be in contact with the stage ST and may be fixed to the stage ST.

The first protective film assembly APF1 may include the first protective films PF1 and a first release film CF1. The first protective films PF1 may include a first left protective film PF1L and a first right protective film PF1R. The first protective films PF1L and PF1R may include a first surface S1 and a second surface S2 opposite to the first surface S1. In an embodiment, the first surface S1 may be a lower surface, and the second surface S2 may be an upper surface of the first protective films PF1. The first release film CF1 may be attached to the first surface S1 of the first protective films PF1L and PF1R. As an example, the first release film CF1 may be monolithic and coupled to one surface of the first left protective film PF1L and one surface (e.g., the first surface S1) of the first right protective film PF1R, which are adjacent to the upper surface U_WM of the substrate WM. That is, the first release film CF1 may be provided in a single unitary form (i.e., monolithic). A boundary between the first left protective film PF1L and the first right protective film PF1R may overlap the first release film CF1.

As the first release film CF1 is monolithic and coupled to the first protective films PF1L and PF1R, tolerances associated with attaching the first protective films PF1L and PF1R to the substrate WM may be reduced or prevented from occurring. Accordingly, defects, such as a void or an overlap between the first left protective film PF1L and the first right protective film PF1R, may not occur, and thus, foreign substances or stains on the substrate WM may be effectively reduced or prevented.

The first protective films PF1L and PF1R may be attached to the upper surface U_WM of the substrate WM (S130). In detail, the first release film CF1 of the first protective film assembly APF1 may be removed from the first protective films PF1L and PF1R, and then the first protective films PF1L and PF1R may be attached to the upper surface U_WM of the substrate WM.

FIG. 5 shows two first protective films PF1L and PF1R as a representative example, however, the number of the first protective films PF1L and PF1R should not be particularly limited. As another example, the number of the first protective films PF1L and PF1R may be four.

Figure 6:
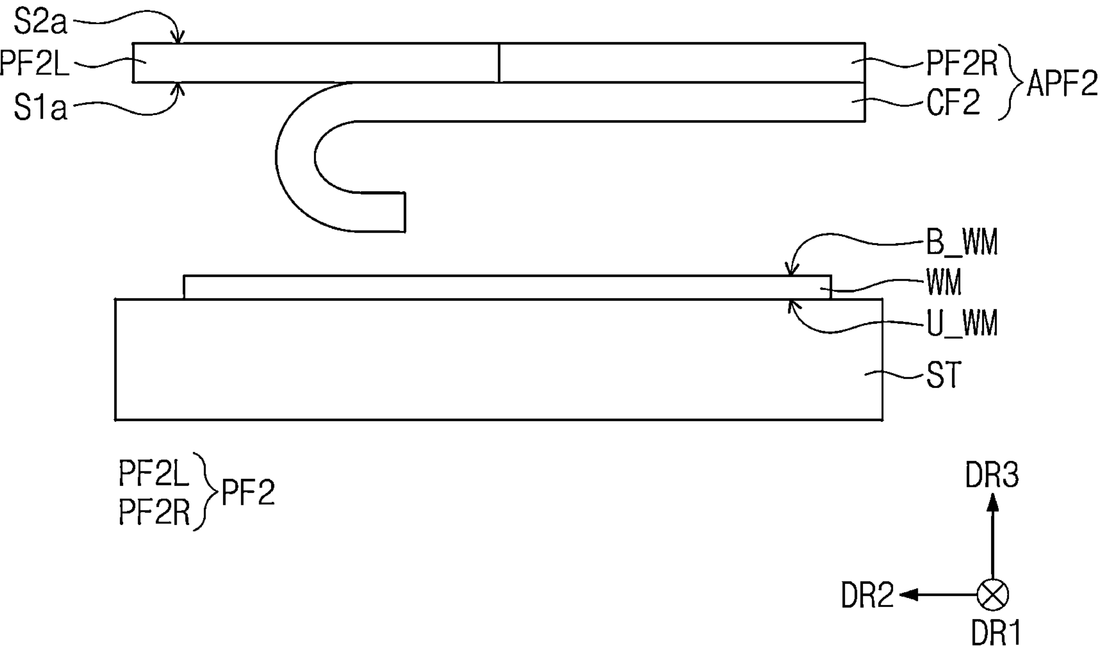

FIG. 6 is a view of a method of manufacturing the display device according to an embodiment of the present disclosure. FIG. 6 shows a process of attaching the second protective films PF2 to the lower surface B_WM of the substrate WM.

Referring to FIGS. 4 and 6, the second protective film assembly APF2 may be disposed above the lower surface B_WM of the substrate WM (S140). The upper surface U_WM of the substrate WM may be in contact with the stage ST and may be fixed to the stage ST. To this end, the substrate WM may be turned upside down to allow the upper surface U_WM of the substrate WM to face the direction of gravity and may be in contact with the stage ST disposed thereunder, however, it should not be limited thereto or thereby. As another example, the stage ST may be placed above the substrate WM without the substrate WM being inverted, and the stage ST may suction-hold the upper surface U_WM of the substrate WM.

The second protective film assembly APF2 may include the second protective films PF2 and a second release film CF2. The second protective films PF2 may include a second left protective film PF2L and a second right protective film PF2R. The second protective films PF2L and PF2R may include a first surface S1*a* and a second surface S2*a* opposite to the first surface S1*a*. The second release film CF2 may be attached to the first surface S1*a* of the second protective films PF2L and PF2R. As an example, the second release film CF2 may be monolithic and coupled to one surface (e.g., the first surface S1*a*) of the second left protective film PF2L and one surface of the second right protective film PF2R, which are adjacent to the lower surface B_WM of the substrate WM. That is, the second release film CF2 may be provided in a single unitary form (i.e., monolithic). A boundary between the second left protective film PF2L and the second right protective film PF2R may overlap the second release film CF2.

As the second release film CF2 is monolithic and coupled to the second protective films PF2L and PF2R, tolerances associated with attaching the second protective films PF2L and PF2R to the substrate WM may be effectively reduced or prevented from occurring. Accordingly, defects, such as a void or an overlap between the second left protective film PF2L and the second right protective film PF2R, may not occur, and thus, foreign substances or stains on the substrate WM may be reduced or prevented.

The second protective films PF2L and PF2R may be attached to the lower surface B_WM of the substrate WM (S150). In detail, the second release film CF2 of the second protective film assembly APF2 may be removed from the second protective films PF2L and PF2R, and then the second protective films PF2L and PF2R may be attached to the lower surface B_WM of the substrate WM.

In FIG. 6, the first protective films PF1L and PF1R (refer to FIG. 5) attached to the upper surface U_WM of the substrate WM are not illustrated, however, the present disclosure should not be limited thereto or thereby. As an example, the first protective films PF1L and PF1R may be attached to the upper surface U_WM of the substrate WM, and the stage ST may be in contact with and may be fixed to the first protective films PF1L and PF1R.

Referring to FIGS. 5 and 6, the order in which the first protective films PF1 and the second protective films PF2 are attached to the substrate WM should not be particularly limited. As an example, according to an embodiment, the second protective films PF2 may be attached to the lower surface B_WM of the substrate WM after the first protective films PF1 are attached to the upper surface U_WM of the substrate WM. According to an embodiment, the first protective films PF1 may be attached to the upper surface U_WM of the substrate WM after the second protective films PF2 are attached to the lower surface B_WM of the substrate WM.

Figure 7:
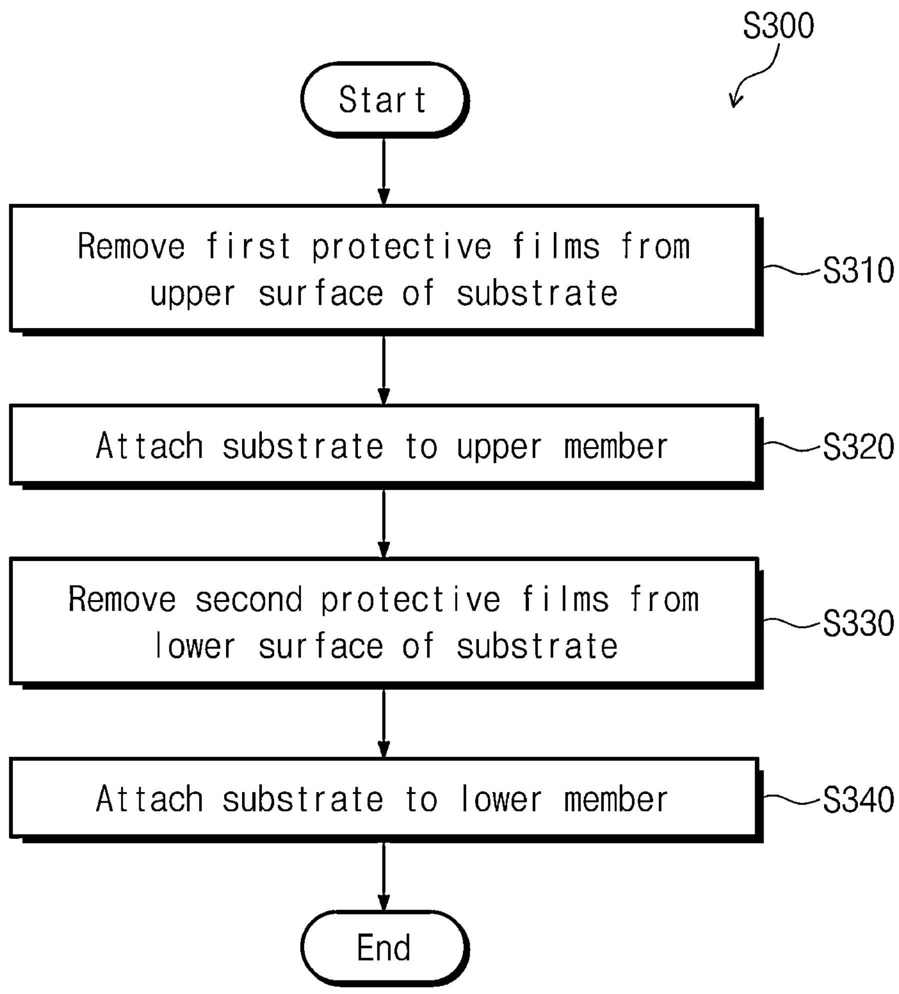
FIG. 7 is a flowchart of a method of attaching a window assembly to a display module according to an embodiment of the present disclosure.

FIG. 7 is a flowchart of a method of attaching the window assembly to the display module (S300) according to an embodiment of the present disclosure.

Referring to FIG. 7, the attaching of the window assembly to the display module (S300) may include: removing the first protective films from the upper surface of the substrate (S310), attaching the substrate to the upper member (S320), removing the second protective films from the lower surface of the substrate (S330), and attaching the substrate to the lower member (S340).

Figure 11A:
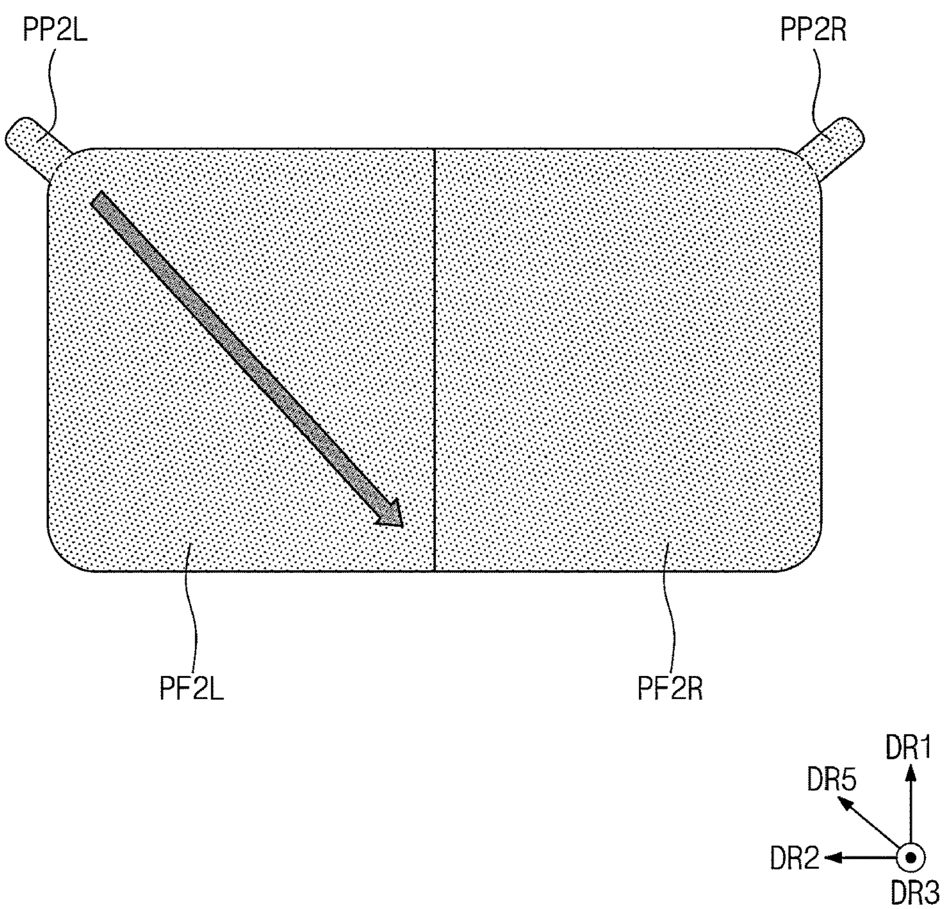
FIG. 11A is a plan view of a method of manufacturing a display device according to an embodiment of the present disclosure.

The removing of the first protective films attached to the upper surface of the substrate (S310) may include removing the first left protective film PF1L (refer to FIG. 8A) and removing the first right protective film PF1R (refer to FIG. 8A), and the removing of the second protective films attached to the lower surface of the substrate (S330) may include removing the second left protective film PF2L (refer to FIG. 11A) and removing the second right protective film PF2R (refer to FIG. 11A).

Figure 8A:
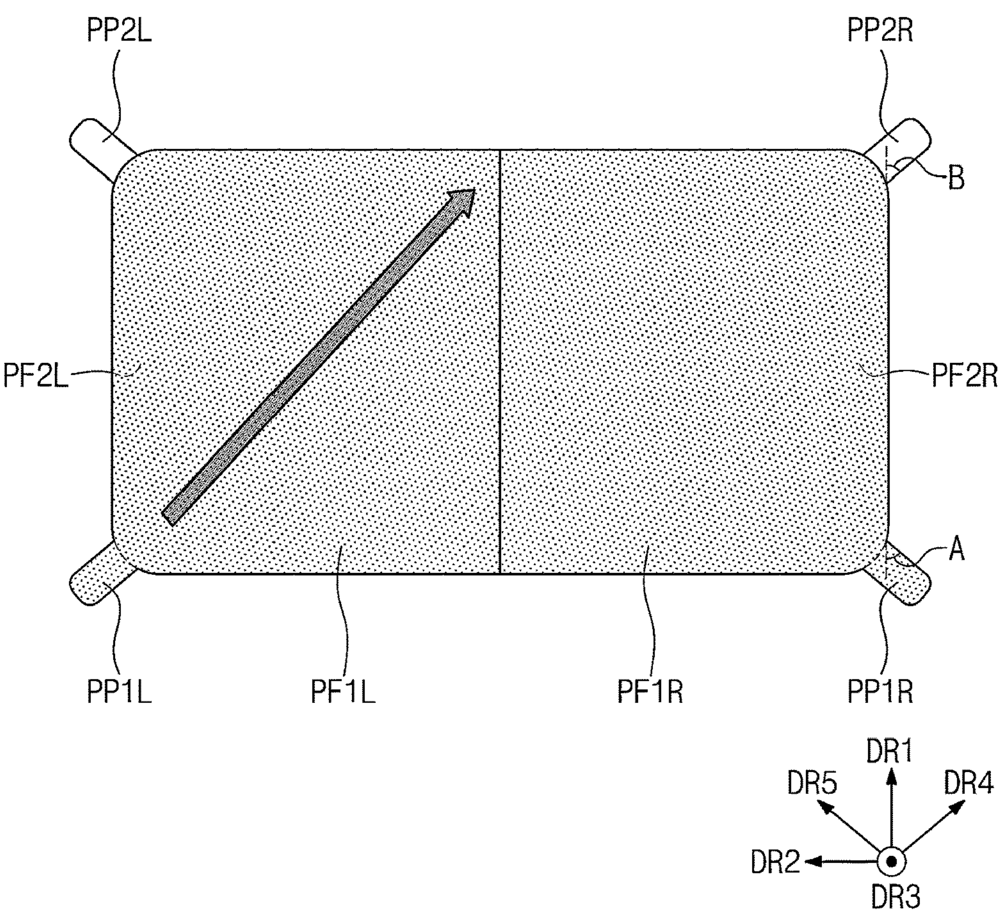
FIG. 8A is a plan view of a method of manufacturing a display device according to an embodiment of the present disclosure.
Figure 8B:
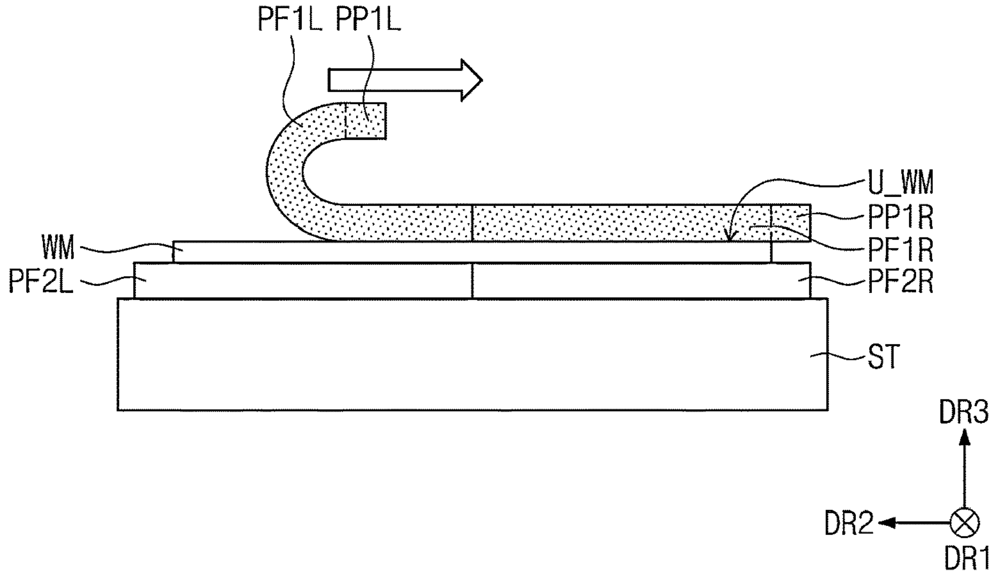
FIG. 8B is a cross-sectional view of a method of manufacturing a display device according to an embodiment of the present disclosure.

FIG. 8A is a plan view of a method of manufacturing the display device according to an embodiment of the present disclosure. FIG. 8B is a cross-sectional view of a method of manufacturing the display device according to an embodiment of the present disclosure. As used herein the "plan view" is a view from a thickness direction (i.e., the third direction DR3) of the protective films.

Referring to FIGS. 8A and 8B, the substrate WM may include short sides extending in the first direction DR1 and long sides extending in the second direction DR2. Each of the first protective films PF1L and PF1R may include long sides extending in the first direction DR1, short sides extending in the second direction DR2, and a corresponding one of first protrusions PP1L and PP1R each protruding from at least one portion of portions where the long sides intersect the short sides. The first protrusions PP1L and PP1R may include a first left protrusion PP1L and a first right protrusion PP1R, respectively. As an example, the first left protrusion PP1L may extend from the portion where the long side of the first left protective film PF1L intersects with the short side of the first left protective film PF1L to a direction opposite to a fourth direction DR4, and the first right protrusion PP1R may extend from the portion where the long side of the first right protective film PF1R intersects the short side of the first right protective film PF1R to a direction opposite to a fifth direction DR5. Accordingly, the first left protrusion PP1L and the first right protrusion PP1R may not overlap the substrate WM.

Each of the second protective films PF2L and PF2R may include long sides extending in the first direction DR1, short sides extending in the second direction DR2, and a corresponding one of second protrusions PP2L and PP2R each protruding from at least one portion of portions where the long sides intersect the short sides. The second protrusions PP2L and PP2R may include a second left protrusion PP2L and a second right protrusion PP2R, respectively. As an example, the second left protrusion PP2L may extend from the portion where the long side of the second left protective film PF2L intersects the short side of the second left protective film PF2L to the fifth direction DR5, and the second right protrusion PP2R may extend from the portion where the long side of the second right protective film PF2R intersects the short side of the second right protective film PF2R to the fourth direction DR4. Accordingly, the second left protrusion PP2L and the second right protrusion PP2R may not overlap the substrate WM.

Each of an angle A between a longitudinal direction of the first left protrusion PP1L of the first protective film PF1L and the long side of the first protective film PF1L and an angle A between a longitudinal direction of the first right protrusion PP1R of the first protective film PF1R and the long side of the first protective film PF1R may be about 45 degrees. Each of an angle B between a longitudinal direction of the second left protrusion PP2L of the second protective film PF2L and the long side of the second protective film PF2L and an angle B between a longitudinal direction of the second right protrusion PP2R of the second protective film PF2R and the long side of the second protective film PF2R may be about 45 degrees. As the angles A and B between longitudinal directions of the protrusions PP1L, PP1R, PP2L, and PP2R of the protective films PF1L, PF1R, PF2L, and PF2R and the long sides of the protective films PF1L, PF1R, PF2L, and PF2R are about 45 degrees, the portions, i.e., vertices, where the long sides meet the short sides of the protective films PF1L, PF1R, PF2L, and PF2R may be effectively prevented from being torn.

In the plan view, the first protrusions PP1L and PP1R of the first protective films PF1L and PF1R may not overlap the second protrusions PP2L and PP2R of the second protective films PF2L and PF2R.

FIG. 8A shows two first protrusions PP1L and PP1R of the first protective films PF1L and PF1R as a representative example, however, the number of the first protrusions PP1L and PP1R should not be limited thereto or thereby. As an example, the number of the first protrusions PP1L and PP1R may be changed depending on the number of the first protective films PF1L and PF1R, i.e., the number of peeling processes. Similarly, the number of the second protrusions PP2L and PP2R may also be changed depending on the number of the second protective films PF2L and PF2R, i.e., the number of peeling processes.

Referring to FIGS. 7, 8A, and 8B, the first left protective film PF1L of the first protective films PF1L and PF1R, which is attached to the upper surface U_WM of the substrate WM, may be removed. When the first left protrusion PP1L is pulled toward the fourth direction DR4, the first left protective film PF1L coupled with the upper surface U_WM of the substrate WM may be removed along the fourth direction DR4. The fourth direction DR4 may be a direction between the first direction DR1 and the direction opposite to the second direction DR2.

Figure 9A:
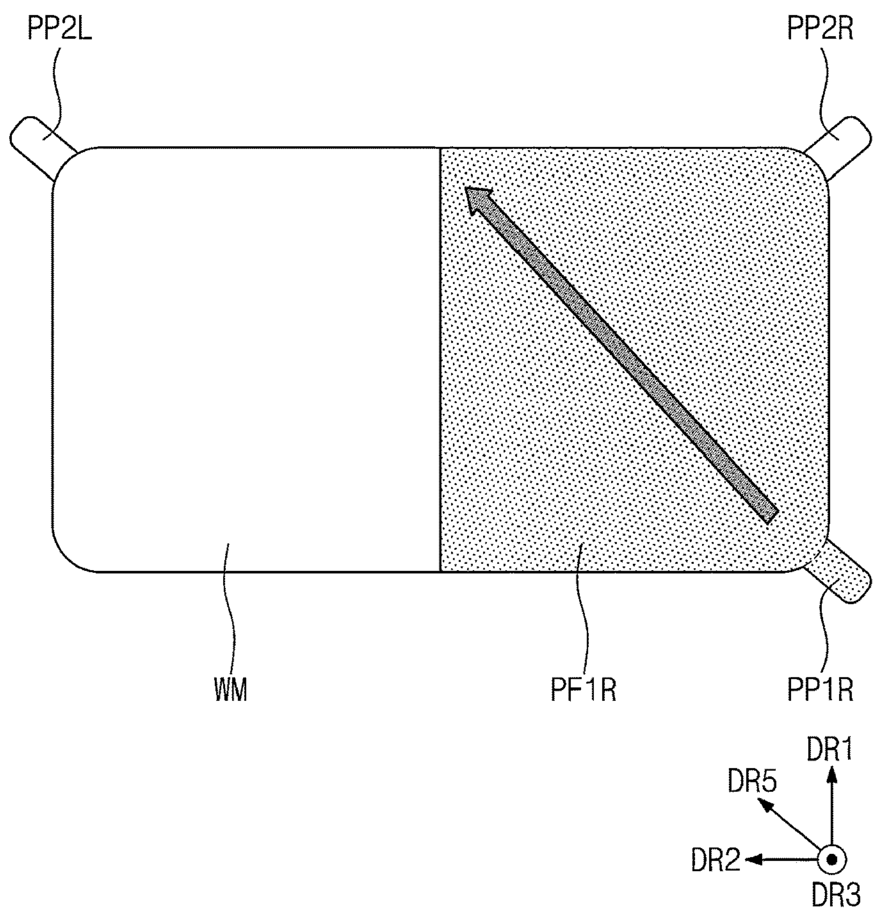
FIG. 9A is a plan view of a method of manufacturing a display device according to an embodiment of the present disclosure.
Figure 9B:
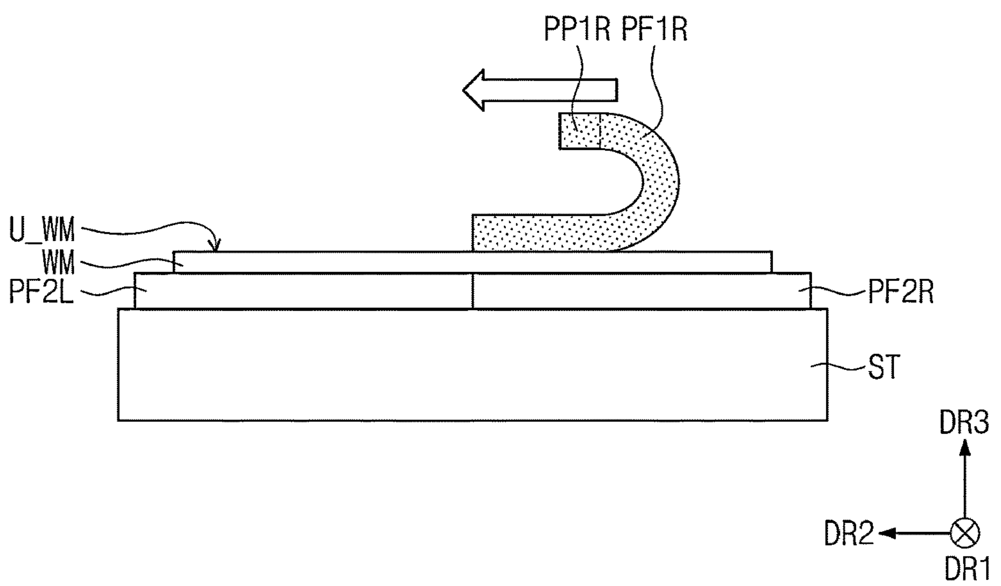
FIG. 9B is a cross-sectional view of a method of manufacturing a display device according to an embodiment of the present disclosure.

FIG. 9A is a plan view of a method of manufacturing the display device according to an embodiment of the present disclosure. FIG. 9B is a cross-sectional view of a method of manufacturing the display device according to an embodiment of the present disclosure.

Referring to FIGS. 7, 9A and 9B, the first right protective film PF1R of the first protective films PF1L and PF1R (refer to FIG. 8A), which is attached to the upper surface U_WM of the substrate WM, may be removed. When the first right protrusion PP1R is pulled toward the fifth direction DR5, the first right protective film PF1R attached to the upper surface U_WM of the substrate WM may be removed along the fifth direction DR5. The fifth direction DR5 may be a direction between the first direction DR1 and the second direction DR2.

Referring to FIGS. 8B and 9B, as the number of the first protective films PF1 is plural, a size of each of the first protective films PF1 covering the substrate WM may be reduced. Accordingly, a release force applied when the first protective film PF1 is removed (or peeled) from the substrate WM may be reduced. As a result, separation of the substrate WM from the stage ST, which is caused by the great release force, and delamination or damage of the substrate WM, which occurs when the protective films are removed, may be reduced, and a size of an equipment used to peel the protective films may be reduced. The release force may refer to a force required to be continuously applied to separate the protective film from an adhesive.

Figure 10:
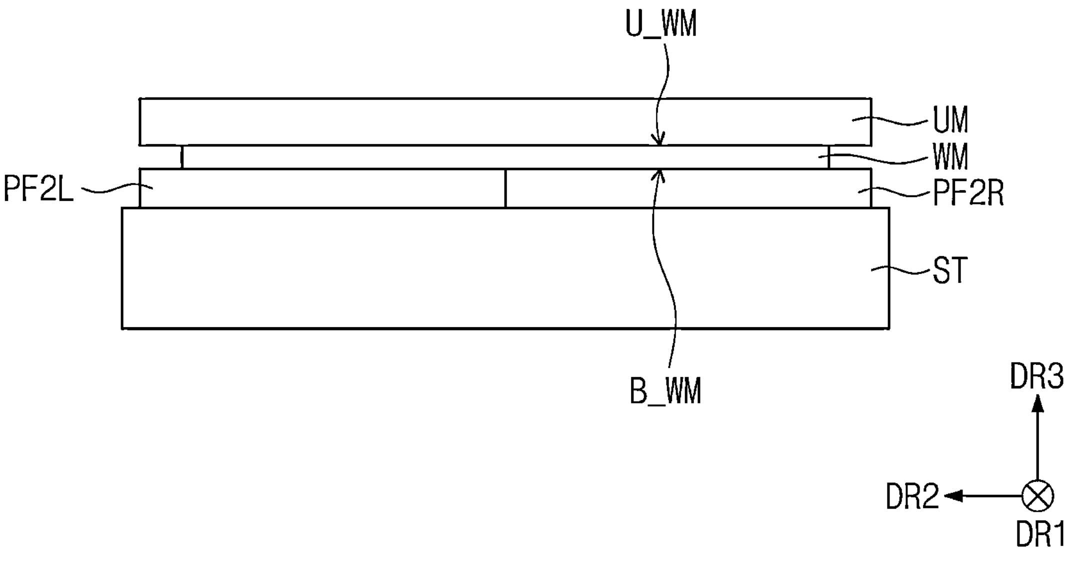
FIG. 10 is a view of a method of manufacturing a display device according to an embodiment of the present disclosure.

FIG. 10 is a view of a method of manufacturing the display device according to an embodiment of the present disclosure.

Referring to FIGS. 7 and 10, the substrate WM may be attached to the upper member UM. In detail, the upper surface U_WM of the substrate WM from which the first left protective film PF1L (refer to FIG. 8A) and the first right protective film PF1R (refer to FIG. 8A) are removed may be attached to the upper member UM. The upper member UM may be the upper member UM described with reference to FIG. 2. The substrate WM and the upper member UM attached to the substrate WM may form the window module WMM (refer to FIG. 2).

Figure 11B:
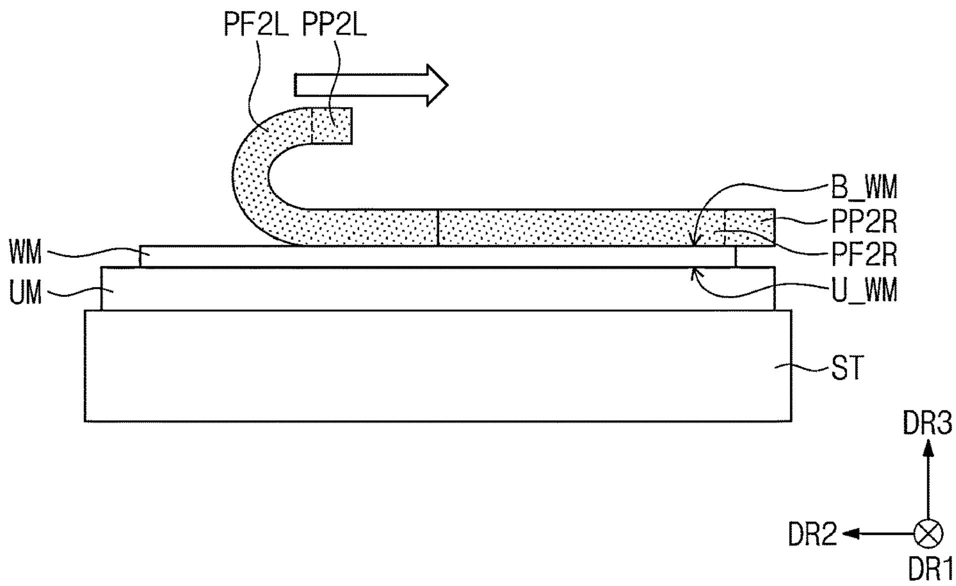
FIG. 11B is a cross-sectional view of a method of manufacturing a display device according to an embodiment of the present disclosure.

FIG. 11A is a plan view of a method of manufacturing the display device according to an embodiment of the present disclosure. FIG. 11B is a cross-sectional view of a method of manufacturing the display device according to an embodiment of the present disclosure.

Referring to FIGS. 7, 11A, and 11B, the second left protective film PF2L of the second protective films PF2L and PF2R, which is attached to the lower surface B_WM of the substrate WM, may be removed. When the second left protrusion PP2L is pulled toward a direction opposite to the fifth direction DR5, the second left protective film PF2L attached to the lower surface B_WM of the substrate WM may be removed along the direction opposite to the fifth direction DR5. The fifth direction DR5 may be a direction between the first direction DR1 and the second direction DR2.

Figure 12A:
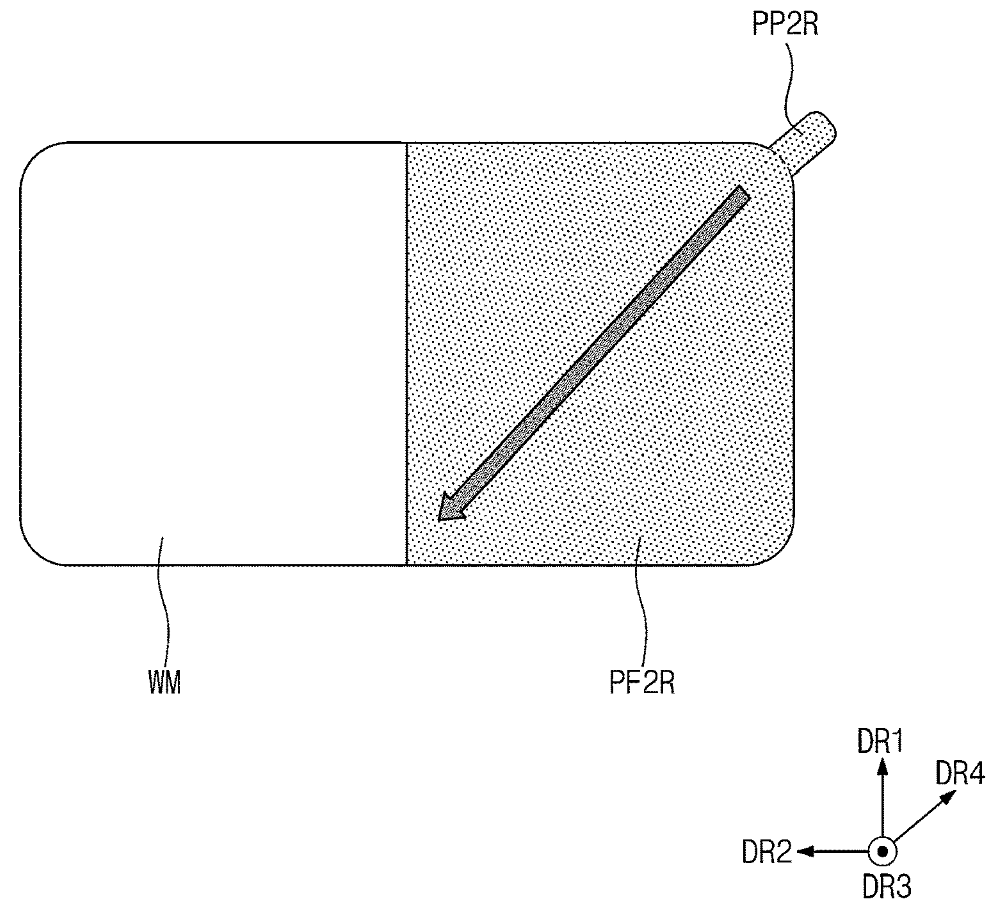
FIG. 12A is a plan view of a method of manufacturing a display device according to an embodiment of the present disclosure.
Figure 12B:
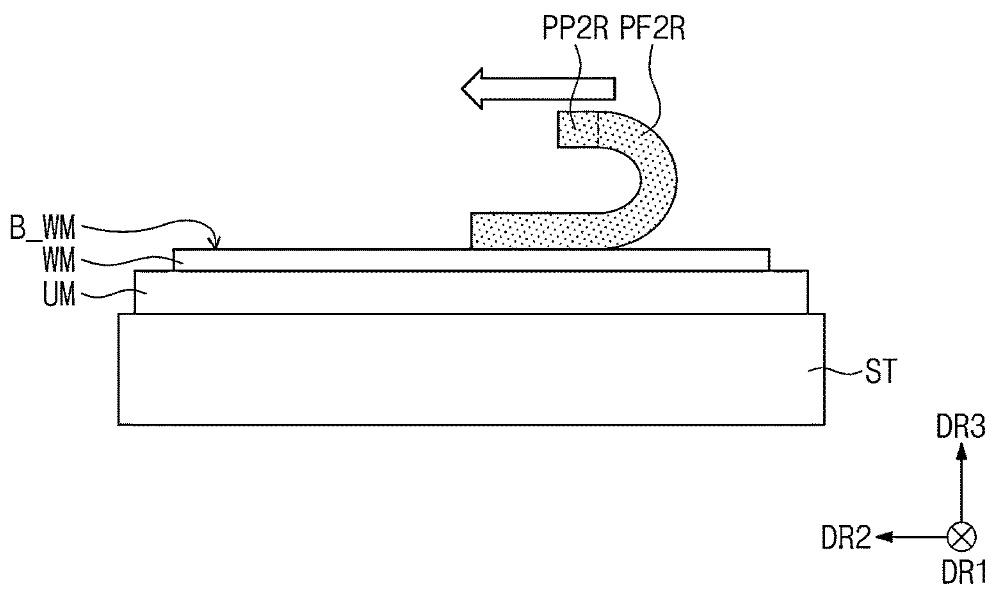
FIG. 12B is a cross-sectional view of a method of manufacturing a display device according to an embodiment of the present disclosure.

FIG. 12A is a plan view of a method of manufacturing the display device according to an embodiment of the present disclosure. FIG. 12B is a cross-sectional view of a method of manufacturing the display device according to an embodiment of the present disclosure.

Referring to FIGS. 7, 12A, and 12B, the second right protective film PF2R of the second protective films PF2L and PF2R (refer to FIG. 11A), which is attached to the lower surface B_WM of the substrate WM may be removed. When the second right protrusion PP2R is pulled toward the direction opposite to the fourth direction DR4, the second right protective film PF2R attached to the lower surface B_WM of the substrate WM may be removed along the direction opposite to the fourth direction DR4. The fourth direction DR4 may be a direction between the first direction DR1 and the direction opposite to the second direction DR2.

Referring to FIGS. 11B and 12B, as the number of the second protective films PF2 is plural, a size of each of the second protective films PF2 covering the substrate WM may be reduced. Accordingly, a release force applied when the second protective film PF2 is removed from the substrate WM may be reduced. As a result, separation of the substrate WM from the stage ST, which is caused by the great release force, and delamination or damage of the substrate WM, which occurs when the protective films are removed, may be reduced, and a size of an equipment used to peel the protective films may be reduced.

Figure 13:
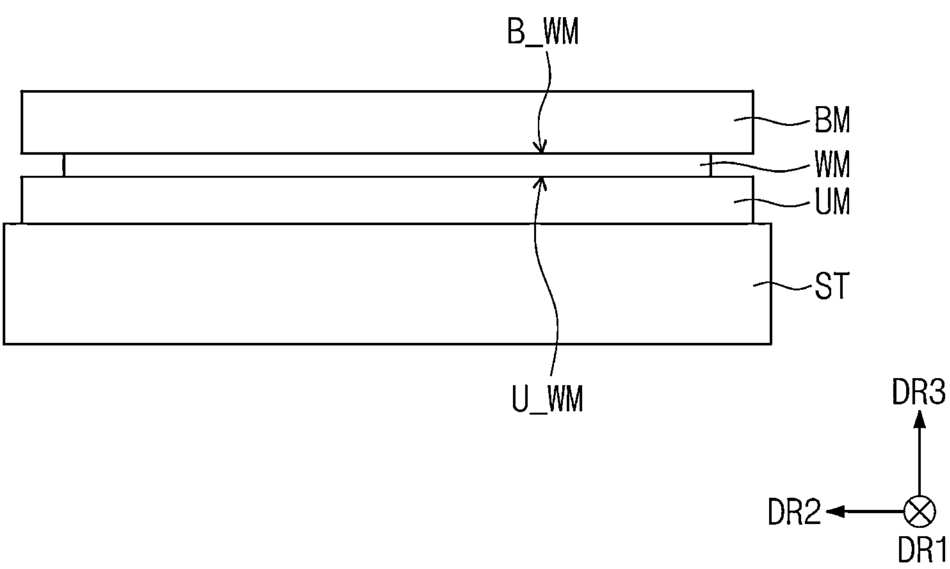
FIG. 13 is a view of a method of manufacturing a display device according to an embodiment of the present disclosure.

FIG. 13 is a view of a method of manufacturing the display device according to an embodiment of the present disclosure.

Referring to FIGS. 7 and 13, the substrate WM may be attached to the lower member BM. In detail, the lower surface B_WM of the substrate WM from which the second left protective film PF2L and the second right protective film PF2R are removed may be attached to the lower member BM. The lower member BM may be the lower member BM described with reference to FIG. 2.

FIG. 13 shows the structure in which the substrate WM is turned upside down to allow the upper member UM to be fixed to the stage ST and the lower member BM to be attached to the substrate WM at an upper side of the substrate WM, however, the present disclosure should not be limited thereto or thereby. As an example, the upper member UM may be fixed to the stage ST at the upper side of the substrate WM, and the lower member BM may be attached to the substrate WM at a lower side of the substrate WM.

In addition, the directions along which the protective films PF1 and PF2 (refer to FIGS. 5 and 6) are removed and positions of the protrusions PP1L, PP1R, PP2L, and PR2R in FIGS. 8A to 12 are merely examples, and the present disclosure should not be limited thereto or thereby.

Figure 14:
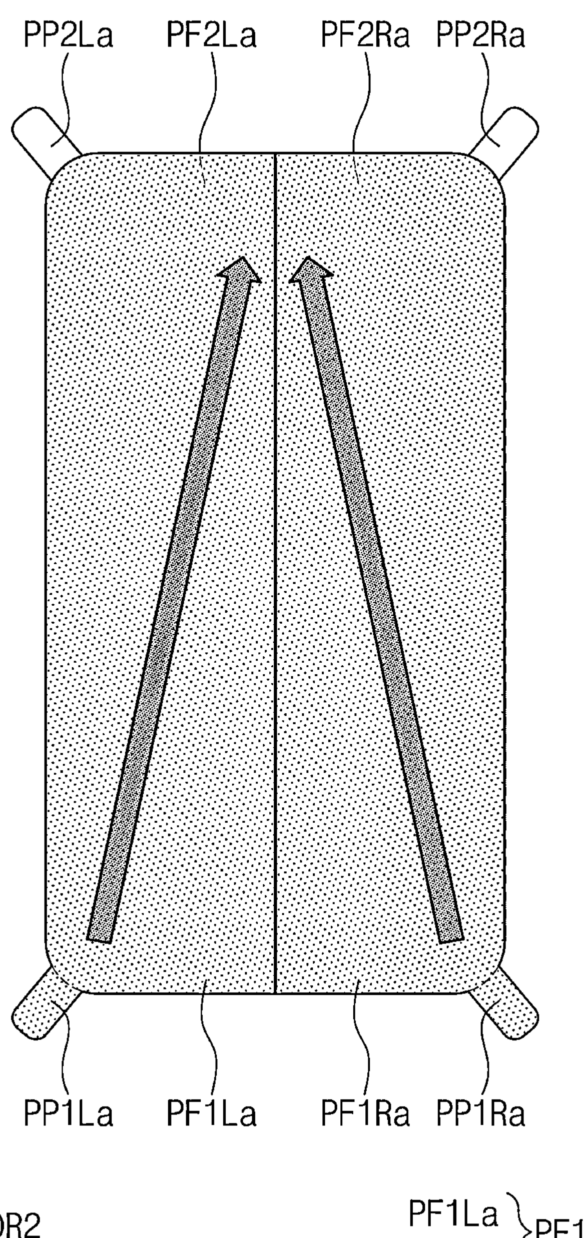
FIGS. 14 and 15 are plan views of protective film assemblies according to an embodiment of the present disclosure.

FIG. 14 is a plan view of a protective film assembly according to an embodiment of the present disclosure.

Referring to FIG. 14, each of first and second protective films PF1*a* and PF2*a* may include short sides extending in the first direction DR1, long sides extending in the second direction DR2, and corresponding two protrusions among protrusions PP1La, PP1Ra, PP2La, and PP2Ra that protrude from at least one portion of portions where the longs sides intersect the short sides.

The protrusions PP1La and PP1Ra of the first protective films PF1*a* may include a first left protrusion PP1La and a first right protrusion PP1Ra. When the first left protrusion PPTLa is pulled toward the fifth direction DR5, a first left protective film PF1La attached to the upper surface U_WM (refer to FIG. 8A) of the substrate WM (refer to FIG. 8A) may be removed along the fifth direction DR5. When the first right protrusion PP1Ra is pulled toward the direction opposite to the fourth direction DR4, a first right protective film PF1Ra attached to the upper surface U_WM of the substrate WM may be removed along the direction opposite to the fourth direction DR4.

Figure 15:
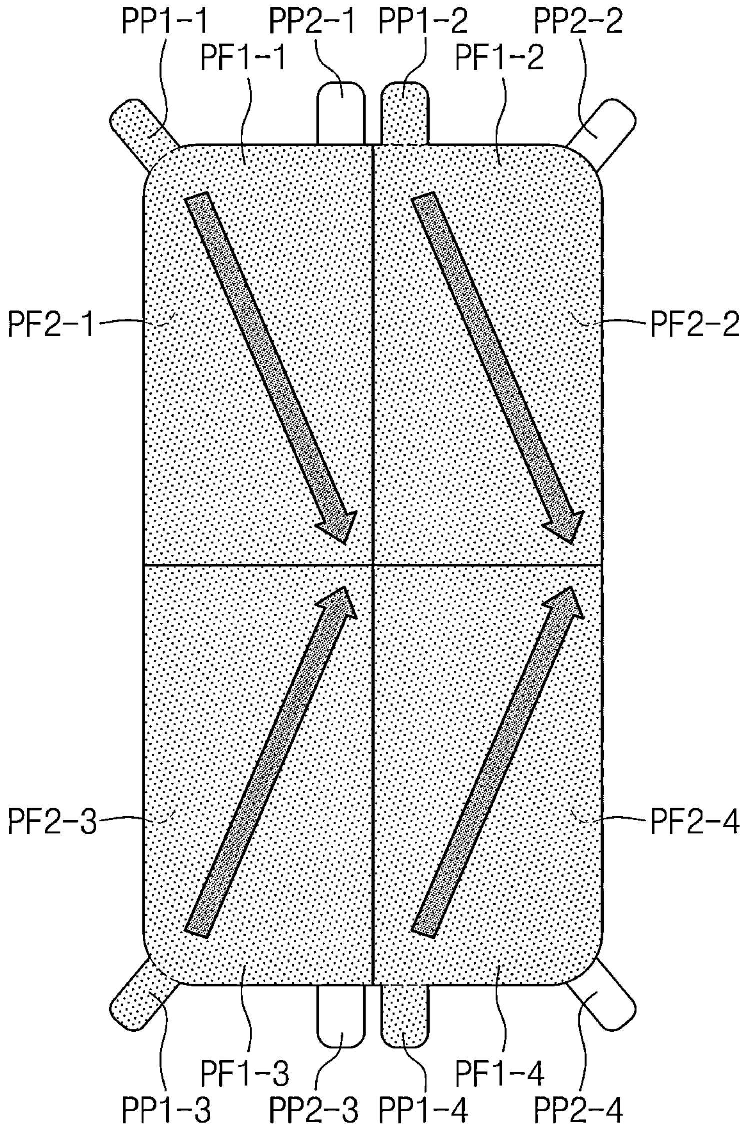
Figure 15:
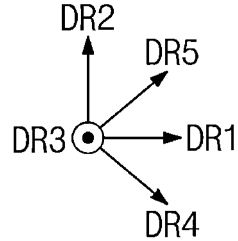

FIG. 15 is a plan view of a protective film assembly according to an embodiment of the present disclosure.

Referring to FIG. 15, the number of first protective films PF1-1, PF1-2, PF1-3, and PF1-4 may be four. Each of first protective films PF1-1, PF1-2, PF1-3, and PF1-4 may include short sides extending in the first direction DR1, long sides extending in the second direction DR2, and a corresponding one of protrusions PP1-1, PP1-2, PP1-3, and PP1-4 each protruding from at least one portion of portions where the short sides intersect the long sides.

The number of second protective films PF2-1, PF2-2, PF2-3, and PF2-4 may be four. Each of second protective films PF2-1, PF2-2, PF2-3, and PF2-4 may include short sides extending in the first direction DR1, long sides extending in the second direction DR2, and a corresponding one of protrusions PP2-1, PP2-2, PP2-3, and PP2-4 each protruding from at least one portion of portions where the short sides intersect the long sides.

The protrusions PP1-1, PP1-2, PP1-3, and PP1-4 of the first protective films PF1-1, PF1-2, PF1-3, and PF1-4 may include a first-first protrusion PP1-1, a first-second protrusion PP1-2, a first-third protrusion PP1-3, and a first-fourth protrusion PP1-4. When the first-first protrusion PP1-1 is pulled toward the fourth direction DR4, a first-first protective film PF1-1 attached to the upper surface U_WM of the substrate WM (refer to FIG. 8A) may be removed along the fourth direction DR4. Similarly, when the first-second protrusion PP1-2 is pulled toward the fourth direction DR4, a first-second protective film PF1-2 attached to the upper surface U_WM of the substrate WM may be removed along the fourth direction DR4.

When the first-third protrusion PP1-3 is pulled toward the fifth direction DR5, a first-third protective film PF1-3 attached to the upper surface U_WM of the substrate WM may be removed along the fifth direction DR5. Similarly, when the first-fourth protrusion PP1-4 is pulled toward the fifth direction DR5, a first-fourth protective film PF1-4 attached to the upper surface U_WM of the substrate WM may be removed along the fifth direction DR5.

FIG. 14 shows two first protective films PF1La and PF1Ra and two second protective films PF2La and PF2Ra as a representative example, and FIG. 15 shows four first protective films PF1-1, PF1-2, PF1-3, and PF1-4 and four second protective films PF2-1, PF2-2, PF2-3, and PF2-4 as a representative example, however, the number of the protective films should not be limited thereto or thereby. The number of the protective films may be changed depending on the shape of the substrate WM (refer to FIG. 2) and processes to be performed. According to an embodiment, the number of the first protective films may be four, and the number of the second protective films may be two.

In addition, FIG. 5 to 15 show the protective films each having a quadrangular shape as a representative example, however, the shape of each of the protective films should not be limited thereto or thereby. The shape of each of the protective films may be changed depending on the shape of the substrate WM and processes to be performed.

In addition, the first-first protective film PF1-1, the first-second protective film PF1-2, the first-third protective film PF1-3, and the first-fourth protective film PF1-4 are illustrated to be removed along the fourth direction DR4 or the fifth direction DR5 in the above-mentioned embodiments, however, the present disclosure should not be limited thereto or thereby. According to an embodiment, the first protective films PF1-1, PF1-2, PF1-3, and PF1-4 or the second protective films PF2-1, PF2-2, PF2-3, and PF2-4 may be removed along the same direction or may be removed along directions different from each other, respectively.

Although the embodiments of the present disclosure have been described, it is understood that the present disclosure should not be limited to these embodiments but various changes and modifications can be made by one ordinary skilled in the art within the spirit and scope of the present disclosure as hereinafter claimed. Therefore, the disclosed subject matter should not be limited to any single embodiment described herein, and the scope of the present invention shall be determined according to the attached claims.

What is claimed is:

1. A method of manufacturing a display device, comprising:
forming a window assembly;
forming a display module; and
attaching the window assembly to the display module,
wherein the forming of window assembly comprises:
preparing a substrate;
placing a first protective film assembly comprising a plurality of first protective films and a first release film on an upper surface of the substrate;
removing the first release film from the plurality of first protective films; and
attaching the plurality of first protective films to the upper surface of the substrate,
wherein each of the plurality of first protective films has a size smaller than that of the size substrate and that of the first release film.

2. The method of claim 1, wherein the attaching of the window assembly to the display module comprises:
removing the plurality of first protective films from the upper surface of the substrate; and
attaching an upper member to the upper surface of the substrate.

3. The method of claim 1, wherein, in the placing of the first protective film assembly on the upper surface of the substrate, the first release film is monolithic and attached to surfaces of the plurality of first protective films facing the upper surface of the substrate.

4. The method of claim 1, wherein a number of the plurality of first protective films is four.

5. A method of manufacturing a display device, comprising:
forming a window assembly;
forming a display module; and
attaching the window assembly to the display module,
wherein the forming of window assembly comprises:
preparing a substrate;
placing a first protective film assembly comprising a plurality of first protective films and a first release film on an upper surface of the substrate;
removing the first release film from the plurality of first protective films; and
attaching the plurality of first protective films to the upper surface of the substrate,
wherein the forming of the window assembly further comprises:

placing a second protective film assembly comprising a plurality of second protective films and a second release film on a lower surface of the substrate;

removing the second release film from the plurality of second protective films; and attaching the plurality of second protective films to the lower surface of the substrate.

6. The method of claim 5, wherein the attaching of the window assembly to the display module comprises:

removing the plurality of second protective films from the lower surface of the substrate; and attaching a lower member to the lower surface of the substrate.

7. The method of claim 5, wherein, in the placing of the second protective film assembly on the lower surface of the substrate, the second release film is monolithic and attached to surfaces of each of the plurality of second protective films facing the lower surface of the substrate.

8. The method of claim 5, wherein the substrate comprises short sides extending in a first direction and long sides extending in a second direction crossing the first direction, and each of the plurality of first protective films and each of the plurality of second protective films comprise long sides, short sides, and a protrusion protruded from at least one portion of portions where the long sides intersect the short sides.

9. The method of claim 8, wherein the long sides of each of the plurality of first protective films extend in the first direction, and the short sides of each of the plurality of first protective films extend in the second direction.

10. The method of claim 8, wherein the short sides of each of the plurality of first protective films extend in the first direction, and the long sides of each of the plurality of first protective films extend in the second direction.

11. The method of claim 8, wherein an angle between a longitudinal direction of the protrusion of the plurality of first protective films and the long side of each of the plurality of first protective films is about 45 degrees.

12. The method of claim 8, wherein the protrusion of the plurality of first protective films does not overlap the protrusion of the plurality of second protective films in a plan view.

13. The method of claim 5, wherein a number of the plurality of second protective films is four.

* * * * *